(12) United States Patent
Tanimoto et al.

(10) Patent No.: US 8,260,376 B2
(45) Date of Patent: Sep. 4, 2012

(54) INFORMATION PROCESSING APPARATUS

(75) Inventors: Fumihiko Tanimoto, Kanagawa-Ken (JP); Takashi Miyajima, Tokyo (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 909 days.

(21) Appl. No.: 12/234,923

(22) Filed: Sep. 22, 2008

(65) Prior Publication Data

US 2009/0124305 A1    May 14, 2009

(30) Foreign Application Priority Data

Nov. 12, 2007  (JP) ............................. P2007-293297

(51) Int. Cl.
*H04M 1/00*  (2006.01)

(52) U.S. Cl. ............... 455/575.1; 455/575.3; 455/575.4; 455/575.8; 455/90.3; 455/558

(58) Field of Classification Search ............... 455/575.1, 455/575.3, 575.4, 575.8, 90.3, 558
See application file for complete search history.

(56) References Cited

U.S. PATENT DOCUMENTS

| | | | | |
|---|---|---|---|---|
| 5,896,277 A * | 4/1999 | Leon et al. | .................... | 361/814 |
| 6,814,597 B1 * | 11/2004 | Kao | .............. | 439/159 |
| 7,197,348 B2 * | 3/2007 | Pan | ............................. | 455/575.8 |
| 7,510,444 B2 * | 3/2009 | Chang et al. | ................... | 439/630 |
| 7,672,691 B2 * | 3/2010 | Kim et al. | ...................... | 455/558 |
| 2002/0094841 A1 * | 7/2002 | Sakaguchi et al. | ............ | 455/558 |
| 2004/0132493 A1 * | 7/2004 | Lin | ................................ | 455/558 |
| 2006/0046544 A1 * | 3/2006 | Ujii et al. | ...................... | 439/159 |
| 2006/0105633 A1 * | 5/2006 | Richter et al. | ................ | 439/630 |

FOREIGN PATENT DOCUMENTS

JP    2005-159638 A    6/2005

* cited by examiner

*Primary Examiner* — Nimesh Patel

(74) *Attorney, Agent, or Firm* — Maschoff Gilmore & Israelsen

(57) ABSTRACT

An information processing apparatus includes an external fit frame having a concave part for battery pack storage, a card storage slot provided on a plane surface formed from one side wall of the external fit frame in an external direction for inserting and removing an IC card, and a wing shaped locking member supported on a back side of the plane surface for IC card locking, in which while the battery pack is mounted to the storage concave part, one end part of a wing part of the locking member abuts to be engaged in one end edge of the battery pack via a first opening part provided on the one side wall, and a locking protrusion formed at another end part of the locking member protrudes from a second opening part provided to the plane surface in a periphery of the one side wall to lock the IC card.

9 Claims, 4 Drawing Sheets

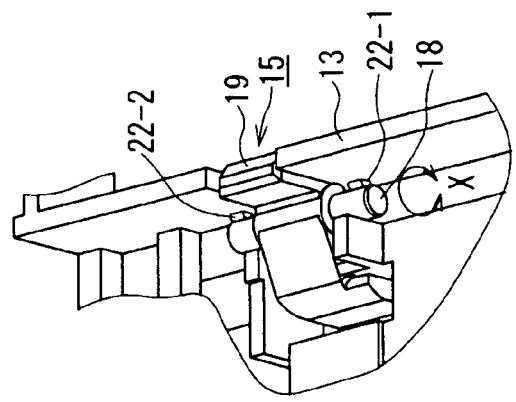
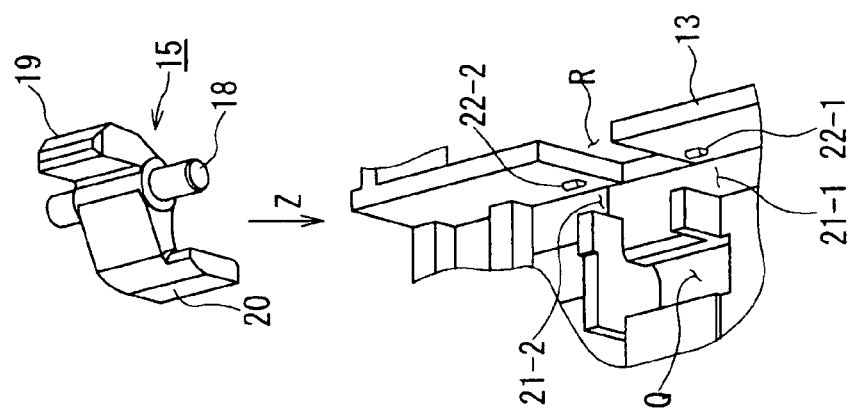
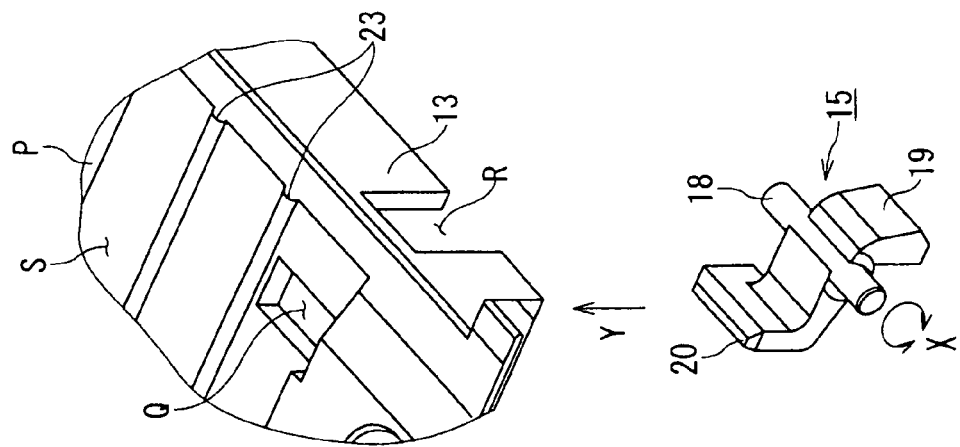

INFORMATION PROCESSING APPARATUS

BACKGROUND OF THE INVENTION

1. Field of the Invention

The present invention relates to an information processing apparatus. In particular, the invention relates to an information processing apparatus capable of inserting and removing an IC card such as a SIM card and USIM card.

2. Description of the Related Art

In recent years, a cellular phone functioning as an information processing apparatus has been mounted with not only a communication function simply based on a voice talk but also various functions including an address book function, a camera function, a mail function through a network such as a base station or the Internet, and a browser function enabling a browsing of a Web page.

Also, some users have a desire to use the same accustomed cellular phone even in a case of traveling or having a business trip to a foreign country. In view of the above, a system called "roaming" has been proposed in which a carrier provides a service by contracting with another carrier outside its service area. In order to realize this system, a subscriber identification card called "SIM (Subscriber Identity Module) card" or "USIM (Universal Subscriber Identity Module) card" is used.

These cards have a built-in IC chip where IDs with respect to a carrier under contract and a telephone number. After such a card is removed from the original cellular phone, by inserting the card into a dedicated slot provided to a cellular phone, it is possible to receive incoming calls with the same telephone number and use individual information such as a telephone directory as it is.

Incidentally, the dedicated slot for inserting and removing the SIM card or the USIM card is generally provided in the vicinity of a battery pack. However, these cards contain various pieces of individual information, and it is therefore necessary to prevent unintentional falling-off of the inserted card at the time of inserting the battery pack.

In view of the above, as a technology related to falling-off prevention of the SIM card or the USIM card, a technology disclosed in Japanese Unexamined Patent Application Publication No. 2005-159638 is known.

However, in recent years, users have demanded more compact and thinner cellular phones. Thus, adopting a structure for simply preventing the falling-off of the SIM card or the USIM card at the time of inserting the battery pack is not sufficient enough, and to be applied to the thinner cellular phone, it is necessary to employ such a structure of a stopper (locking member) for locking the SIM card or the USIM card that does not affect the thickness of a main body of the cellular phone main body. Such a problem cannot however be solved by the technology disclosed in Japanese Unexamined Patent Application Publication No. 2005-159638.

SUMMARY OF THE INVENTION

Accordingly, the present invention has been made in view of the above-mentioned circumstances and it is an object of the invention to provide an information processing apparatus in which while the thickness of a casing is decreased, it is possible to satisfactorily prevent falling-off of an IC card such as a SIM card and a USIM card.

In order to solve the above-mentioned problem, according to an aspect of the present invention, there is provided an information processing apparatus being capable of detaching a battery pack and being capable of inserting an IC card including: an external fit frame having a storage concave part for storing the battery pack; a card storage slot configured to be provided on a plane surface formed from one side wall of the external fit frame in an external direction and configured to insert and remove the IC card; and a wing shaped locking member having two opposite end parts configured to be supported on a back side of the plane surface on which the card storage slot is provided and is configured to lock the IC card inserted into the card storage slot, in which while the battery pack is mounted to the storage concave part of the external fit frame, one end part of the locking member abuts to be engaged in one end edge of the battery pack mounted to the storage concave part of the external fit frame via a first opening part provided on the one side wall of the external fit frame, and a locking protrusion formed at another end part of the locking member protrudes from a second opening part provided to the plane surface in a periphery of the one side wall of the external fit frame to lock the IC card.

According to the aspect of the present invention, while the thickness of the casing is decreased, it is possible to satisfactorily prevent the falling-off of the IC card such as the SIM card and the USIM card.

BRIEF DESCRIPTION OF THE DRAWINGS

FIGS. 3A to 3C are explanatory diagrams for describing a supporting method of a locking member to the casing of the cellular phone;

DESCRIPTION OF THE PREFERRED EMBODIMENTS

Hereinafter, embodiments of the present invention will be described with reference to the drawings.

Figure 1:
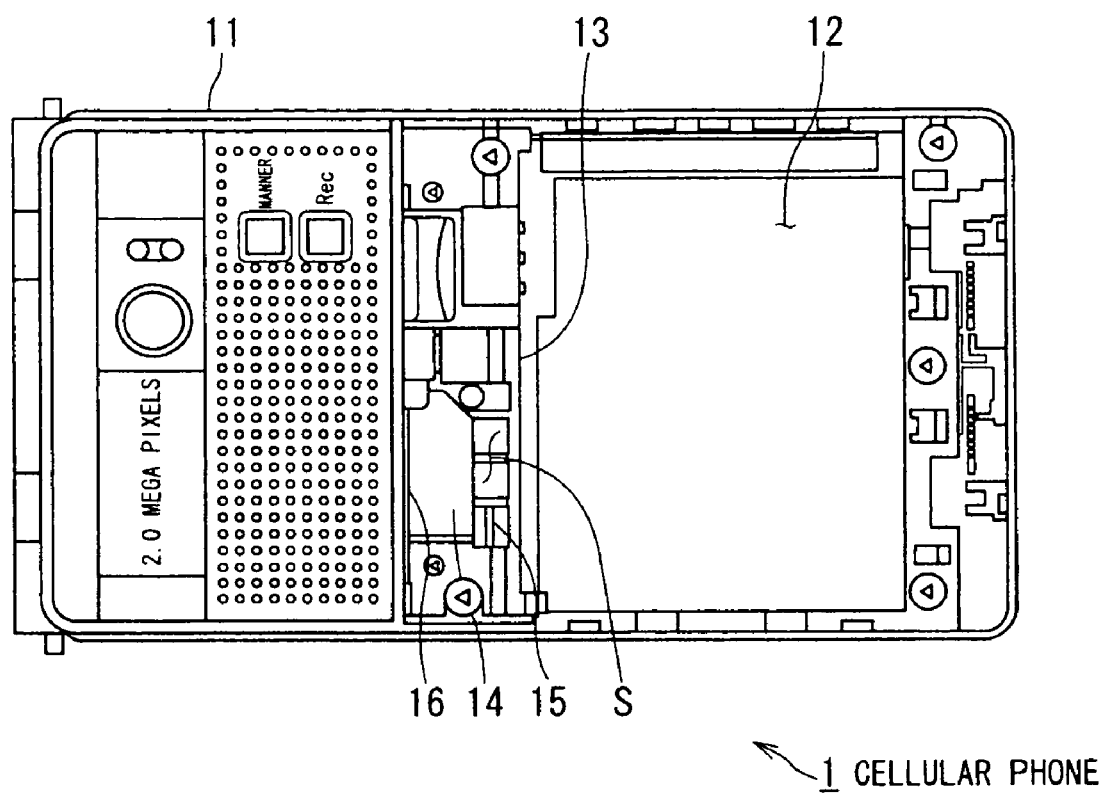
FIG. 1 is a plain view of a casing of a cellular phone according to an embodiment of the present invention.

FIG. 1 is a plain view of a casing 11 of a cellular phone 1 which can be applied to an information processing apparatus according to an embodiment of the present invention. FIG. 1 illustrates a state in which a battery flap (not shown) of the cellular phone 1 and a battery pack (a battery pack 17 in FIG. 2A) are removed, and also a USIM card 14 is inserted into a dedicated card storage slot 16. It should be noted that according to the embodiment of the present invention, the USIM card 14 is demonstratively described, but, the present invention may also be applied to a case in which another IC card other than the SIM card is used.

As illustrated in FIG. 1, the casing 11 in the cellular phone 1 is provided with an external fit frame 13 having a storage concave part 12. The flat plate shaped battery pack 17 is fitted to the storage concave part 12 of the external fit frame 13 through insertion to be mounted if needed. A plane surface S substantially horizontal to be flush with respect to a wall top part on one side in an outward direction which is substantially perpendicular from a wall on the one side of the external fit frame 13 is formed. On the horizontal plane surface S, the dedicated card storage slot 16 for inserting and removing the USIM card 14 is provided. Between the wall on the one side of the external fit frame 13 and the USIM card 14 inserted into the dedicated card storage slot 16, a locking member 15 for locking the USIM card 14 at the time of mounting (fitting) the battery pack 17 is arranged as lock means.

Figure 2A:
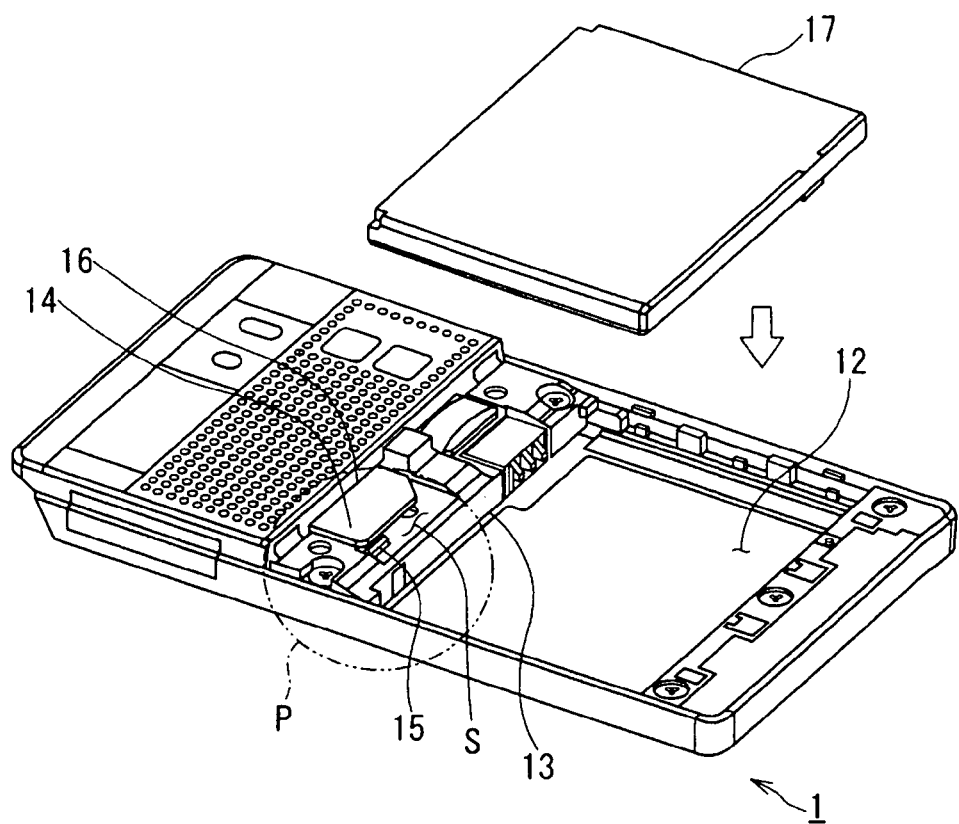
FIG. 2A is a perspective view of the casing of the cellular phone according to the embodiment of the present invention.
Figure 2B:
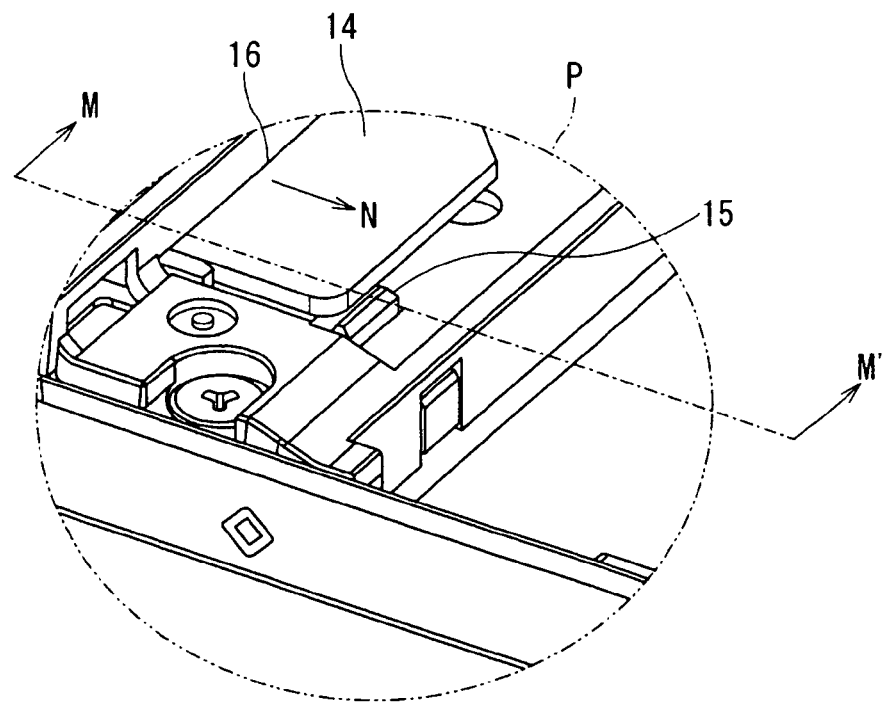
FIG. 2B is an enlarged view of an area P in the casing of the cellular phone illustrated in FIG. 2A.

FIG. 2A is a perspective view of the casing 11 in the cellular phone 1 according to the embodiment of the present invention. As illustrated in FIG. 2A, in a case where the user intends to mount the battery pack 17 to the casing 11 in the cellular phone 1, the battery pack 17 is mounted to the storage concave part 12 of the external fit frame 13 in an arrow direction. Also, FIG. 2B is an enlarged view of an area P in the casing 11 in the cellular phone 1 illustrated in FIG. 2A. As illustrated in FIG. 2B, when the battery pack 17 is mounted to the storage concave part 12 of the external fit frame 13, a locking protrusion of the locking member 15 functioning as the lock means which exists in the vicinity of the USIM card 14 inserted into the dedicated card storage slot 16 protrudes. With this configuration, at the time of mounting of the battery pack 17, the USIM card 14 is locked. It should be noted that a direction of an arrow N in FIG. 2B indicates a pulling out direction of the USIM card 14.

Next, an operation of the locking member 15 at the time of mounting and removing (taking out) the battery pack 17 will be described. Before a description of the operation of the locking member, a description will be given of a supporting method used at the time of supporting of the locking member 15 as the lock means to the casing 11 in the cellular phone 1.

FIGS. 3A to 3C are explanatory diagrams for describing the supporting method of supporting the locking member 15 to the casing 11 in the cellular phone 1. As illustrated in FIG. 3A, the locking member 15 as the lock means for locking the USIM card 14 is molded of resin and the locking member 15 is a wing shaped resin member having wing parts. As a whole, the locking member substantially (generally) has an S shape or a crank shape. Also, the gravity center of the locking member 15 is eccentric at a predetermined eccentric rate from the rigidity center of the locking member 15. The locking member 15 is provided with a rotation shape 18. The locking member 15 is rotatable at a predetermined angle in an arrow X direction. Also, an approximately rectangular protrusion 19 is provided on one end part of the wing part. Furthermore, a locking protrusion 20 for locking a back side of the USIM card (on an insertion ending side) is provided as a stopper on the other end part of the wing part in the locking member 15.

More specifically, the locking member 15 has two wings which protrude in generally opposite directions from the rotation shaft 18 so as to provide a generally S shape to the locking member 15.

On the other hand, at a predetermined position of the plane surface S formed on the casing 11 in the cellular phone 1, an opening part Q is provided through which the locking protrusion 20 provided on the other end part of the wing part in the locking member 15 can protrude when the battery pack 17 is mounted. Also, on the wall on the one side of the external fit frame 13 of the casing 11 in the cellular phone 1, an opening part R is provided so that an edge on the one side of the battery pack 17 can abut the rectangular (engaging) protrusion 19 provided to the one end part of the wing part in the locking member 15 when the battery pack 17 is mounted to the storage concave part 12 of the external fit frame 13.

When the locking member 15 is supported to the casing 11 in the cellular phone 1, the locking member 15 is inserted from the arrow Y direction of FIG. 3A to a back side (back surface) of the plane surface S of the casing 11 in the cellular phone 1.

With reference to FIG. 3B, a description will be given of a state viewed from the back side of the plane surface S when the locking member 15 is supported to the casing 11 in the cellular phone 1. As illustrated in FIG. 3B, on the bask side of the plane surface S of the casing 11 in the cellular phone 1, holding parts 21-1 and 21-2 for holding both ends of the rotation shaft (trunnion) 18 of the locking member 15 with the back surface of the external fit frame 13 so as to rotatably support are provided, and also receiving parts (engaging protrusion parts) 22-1 and 22-2 for holding both the ends of the rotation shaft (trunnion) 18 after being interposed are provided.

When the locking member 15 is inserted into the back side (back surface side) of the plane surface S of the casing 11 in the cellular phone 1 from the arrow Z direction of FIG. 3B, the locking protrusion 20 of the locking member 15 is inserted by a predetermined amount into the opening part Q provided to the casing 11 in the cellular phone 1. It should be noted that the opening part Q is set so that some clearance is generated when the locking protrusion 20 of the locking member 15 is inserted into the opening part Q. Also, the plane surface S of the casing 11 is provided with protrusion guides 23 formed of a plurality of grooves for connecting and guiding the USIM card 14 so that a resistance in sliding the USIM card 14 becomes small. FIG. 3C is a perspective view of the locking member 15 after being supported by the holding parts 21-1 and 21-2 in which the locking member 15 is supported to the casing 11 in the cellular phone 1. As illustrated in FIG. 3C, the locking member 15 after being supported by the holding parts 21-1 and 21-2 can be rotated in the arrow X direction about the rotation shaft 18 by a predetermined angle at the time of mounting or detaching the battery pack 17. It should be noted that the perspective view of the locking member 15 of FIG. 3C illustrates a state of the locking member 15 when the battery pack 17 is mounted.

Figure 4A:
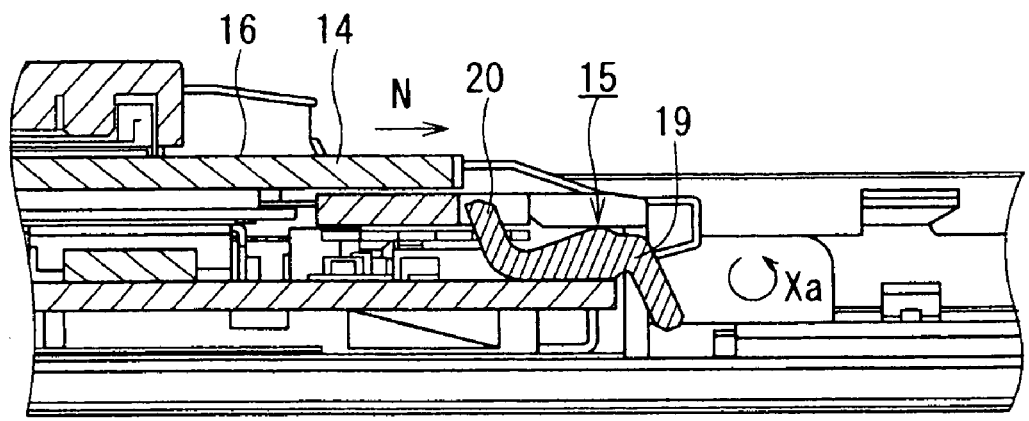
FIG. 4A is a cross sectional view on an M-M' line in FIG. 2B at the time of detaching a battery pack.
Figure 4B:
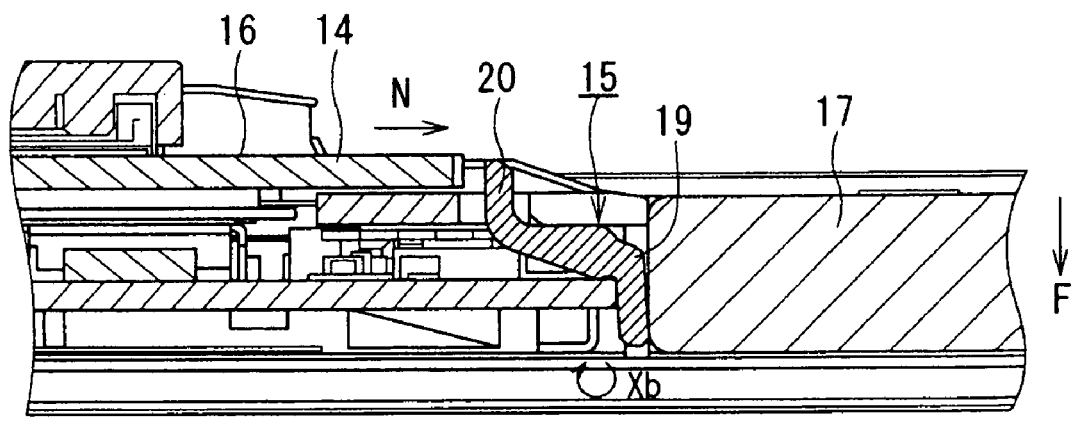
FIG. 4B is a cross sectional view on the M-M' line in FIG. 2B when the battery pack is mounted.

Next, with reference to FIGS. 4A and 4B, a description will be given of operations of the locking member 15 at the time of mounting and detaching (taking out) the battery pack 17. It should be noted that FIGS. 4A and 4B are cross sectional views on an M-M' line in FIG. 2B. FIG. 4A is a cross sectional view on the M-M' line in FIG. 2B when the battery pack 17 is detached, and FIG. 4B is a cross sectional view on the M-M' line in FIG. 2B when the battery pack 17 is mounted.

As illustrated in FIG. 4A, when the battery pack 17 is detached (taken out) by a user from a state in which the battery pack 17 is mounted to the storage concave part 12 of the external fit frame 13 in the cellular phone 1, the battery pack 17 abutting the rectangular protrusion 19 of the locking member 15 when the battery pack is mounted is taken out. Thus, with the eccentricity of the locking member 15, the locking member 15 is rotated at a predetermined angle in an arrow Xa direction of FIG. 4A about the rotation shaft 18 while following its own weight. Along with this rotation operation, the locking protrusion 20 on the other end side of the locking member 15 shifts from a state in which the locking protrusion 20 protrudes from the opening part Q provided to the plane surface S to a set back state in which the locking protrusion 20 does not protrude from the opening part Q. With this configuration, the locking state of the USIM card inserted into the dedicated card storage slot 16 is cancelled and released. With this configuration, the user can afterward pull out the USIM card 14 in an arrow N direction of FIG. 4A.

On the other hand, as illustrated in FIG. 4B, when the user mounts the battery pack 17 from an arrow F direction of FIG. 4B from a state in which the battery pack 17 is removed from the storage concave part 12 of the external fit frame 13 in the cellular phone 1, the rectangular protrusion 19 of the locking member 15 is pressed against the battery pack 17 mounted by the user. Thus, torque is generated about the rotation shaft 18 of the locking member 15, and the locking member 15 is rotated at a predetermined angle about the rotation shaft 18 in an arrow Xb of FIG. 4B. The rectangular protrusion 19 of the locking member 15 abuts the one end edge of the battery pack 17 mounted by the user. Along with this operation, the locking protrusion 20 provided on the other end part of the locking member 15 shifts from a release state in which the locking protrusion 20 does not protrude from the opening part Q provided to the plane surface S to a state in which the locking protrusion 20 protrudes from the opening part Q by a predetermined amount (by about an amount with which the USIM card 14 can be locked). With this configuration, the locking state (lock state) of the USIM card inserted into the dedicated card storage slot 16 is started, and thereafter, it is possible to prevent intentional falling-off of the USIM card 14.

According to the embodiment of the present invention, it is possible to adopt such a configuration that the information processing apparatus includes the flat plate shaped battery pack 17, the external fit frame 13 having the storage concave part 12 for storing the battery pack 17, the card storage slot 16 configured to be provided on the plane surface S formed from the one side wall of the external fit frame 13 in the outward direction and adapted to insert and remove the USIM card 14, and the wing shaped locking member 15 having two opposite end parts configured to be supported on the back side of the plane surface S provided with the card storage slot 16 and to lock the USIM card 14 inserted into the card storage slot 16, in which while the battery pack 17 is mounted to the storage concave part 12 of the external fit frame 13, the one end part of the wing part in the locking member 15 abuts to be engaged in the battery pack 17 which is mounted to the storage concave part 12 of the external fit frame 13 via the opening part R provided on the one side wall of the external fit frame 13, and also the locking protrusion 20 formed on the other end part of the wing part in the locking member 15 protrudes from the opening part Q provided to the plane surface S in a periphery of the one side wall of the external fit frame 13 so that the USIM card 14 is locked, whereas in a state where the battery pack 17 is detached from the storage concave part 12 of the external fit frame 13, the one end of the locking member 15 protrudes from the opening part R so that the locking protrusion of the locking member is retreated from the opening part Q to release the USIM card 14.

With this configuration, even in a case where the dedicated card storage slot 16 through which the USIM card 14 (the SIM card or the USIM card) is inserted and removed is provided at an upper position of the battery pack 17 in accordance with the reduction of the thickness of the casing of the cellular phone 1 or is provided at a position away from the battery pack, it is possible to satisfactorily lock the SIM card or the USIM card 14. Therefore, while reducing the thickness of the casing of the cellular phone 1, it is possible to satisfactorily prevent the unintentional falling-off of the SIM card or the USIM card. As a result, it is possible to satisfactorily protect the individual information recorded in the SIM card or the USIM card, and also the usability at the time of using the SIM card or the USIM card can be improved.

It should be noted that according to the embodiment of the present invention, such a configuration is adopted that the locking member 15 for locking the USIM card 14 is formed of the resin member, but for example, a leaf spring, a spring, or the like may also be used together with the resin member to configure the locking member 15.

It should be noted that the present invention can be applied to cellular phones in various styles including a slide style, a straight style, a clamshell style, and the like.

It should be noted that the present invention can also be applied to information processing apparatuses other than the cellular phone 1, such as a PDA (Personal Digital Assistant), a personal computer, a portable game machine, a portable music player, and a portable video player.

What is claimed is:

1. An information processing apparatus being capable of detaching a battery pack and being capable of inserting an IC card, the information processing apparatus comprising:
   an external fit frame having a storage concave part for storing the battery pack;
   a card storage slot configured to be provided on a plane surface formed from one side wall of the external fit frame in an external direction and configured to insert and remove the IC card; and
   a locking member having two opposite end parts configured to be supported on a back side of the plane surface on which the card storage slot is provided and configured to lock the IC card inserted into the card storage slot,
   wherein while the battery pack is mounted to the storage concave part of the external fit frame, one end part of the locking member abuts to be engaged in one end edge of the battery pack mounted to the storage concave part of the external fit frame via a first opening part provided on the one side wall of the external fit frame, the one end part of the locking member engaging with the battery pack causes the locking member to pivot such that a locking protrusion formed at another end part of the locking member protrudes from a second opening part provided in the plane surface in a periphery of the one side wall of the external fit frame to lock the IC card.

2. The information processing apparatus according to claim 1, wherein while the battery pack is detached from the storage concave part of the external fit frame, the one end part of the locking member protrudes from the first opening part and the locking protrusion of the locking member is retreated from the second opening part to release the IC card.

3. The information processing apparatus according to claim 1, wherein the locking member further includes a rotation shaft, and the locking member is rotatable at a predetermined angle around the rotation shaft, and both ends of the rotation shaft are held by holding parts provided to the back side of the plane surface.

4. The information processing apparatus according to claim 3, wherein while the battery pack is mounted to the storage concave part of the external fit frame, the one end part of the locking member is engaged with the battery pack via the first opening part, and the locking member is rotated by a predetermined angle around the rotation shaft to lock the IC card with another end part of the locking member.

5. The information processing apparatus according to claim 3, wherein while the battery pack is detached from the storage concave part of the external fit frame, the locking member is rotated by a predetermined angle around the rotation shaft until the one end part of the locking member protrudes from the first opening part, and the other end part of the locking member is retreated from the second opening part to release the IC card.

6. The information processing apparatus according to claim 3, wherein the locking member has two wings which protrude in opposite directions from the rotation shaft thereby providing the two opposite end parts.

7. The information processing apparatus according to claim 1, wherein the locking member has an S shape or a crank shape.

8. The information processing apparatus according to claim 1, wherein the locking member is configured by molding a resin.

9. The information processing apparatus according to claim 1, wherein the IC card includes a SIM card or an USIM card.

* * * * *